United States Patent
Smith et al.

(10) Patent No.: US 10,986,100 B1
(45) Date of Patent: Apr. 20, 2021

(54) SYSTEMS AND METHODS FOR PROTECTING WEBSITE VISITORS

(71) Applicant: CA, INC., San Jose, CA (US)

(72) Inventors: Spencer Smith, El Segundo, CA (US); Petrus Johannes Viljoen, Manhattan Beach, CA (US)

(73) Assignee: CA, Inc., San Jose, CA (US)

( * ) Notice: Subject to any disclaimer, the term of this patent is extended or adjusted under 35 U.S.C. 154(b) by 262 days.

(21) Appl. No.: 15/919,246

(22) Filed: Mar. 13, 2018

(51) Int. Cl.
*H04L 29/06* (2006.01)
*H04L 29/08* (2006.01)
*G06F 16/955* (2019.01)
*G06F 16/957* (2019.01)

(52) U.S. Cl.
CPC .......... *H04L 63/123* (2013.01); *G06F 16/955* (2019.01); *G06F 16/957* (2019.01); *H04L 63/14* (2013.01); *H04L 67/025* (2013.01)

(58) Field of Classification Search
CPC ..... H04L 63/123; H04L 63/14; H04L 67/025; G06F 16/955; G06F 16/957
See application file for complete search history.

(56) References Cited

U.S. PATENT DOCUMENTS

| | | | | |
|---|---|---|---|---|
| 2009/0064337 A1* | 3/2009 | Chien | .................. | G06F 21/564 726/25 |
| 2010/0115615 A1* | 5/2010 | Hubbard | .............. | G06F 16/951 726/22 |
| 2011/0258532 A1* | 10/2011 | Ceze | .................. | G06F 16/9574 715/234 |
| 2014/0324447 A1* | 10/2014 | Dittus | ................ | G06Q 30/0269 705/2 |
| 2015/0082424 A1* | 3/2015 | Shukla | .................. | H04L 63/123 726/22 |

(Continued)

OTHER PUBLICATIONS

S. Pastore; Web Content Management Systems: using Plone open source software to build a website for research institute needs; International Conference on Digital Telecommunications (ICDT'06) (p. 24); (Year: 2009).*

(Continued)

*Primary Examiner* — Kari L Schmidt
*Assistant Examiner* — Chao Wang
(74) *Attorney, Agent, or Firm* — FisherBroyles, LLP

(57) ABSTRACT

The disclosed computer-implemented method for protecting website visitors may include (i) retrieving an instance of a website that was dynamically generated by aggregating multiple website subcomponents, (ii) decomposing the instance of the website into the multiple website subcomponents, (iii) checking whether a website subcomponent has been previously scanned by a security scanner, (iv) accelerating a review of the instance of the website by reusing results of a previous scan of the website subcomponent that was performed in response to retrieving a different instance of the website subcomponent rather than performing an original scan of the website subcomponent, and (v) protecting a visitor of the website by modifying a display of the instance of the website based on the accelerated review of the instance of the website that reused results of the previous scan of the website subcomponent. Various other methods, systems, and computer-readable media are also disclosed.

20 Claims, 6 Drawing Sheets

(56) References Cited

U.S. PATENT DOCUMENTS

2017/0324760 A1\* 11/2017 Gorny ................ H04L 63/1425
2018/0054499 A1\* 2/2018 Greenberg ............. H04L 67/02

OTHER PUBLICATIONS

Markus Jakobsson; How things Work and Fail; Wiley-IEEE Press 2012 (Edition: 1, pp. 386); (Year: 2012).\*
Kurt Thomas • Elie Bursztein • Chris Grier • Grant Ho • Nav Jagpal • Alexandros Kapravelos • Damon Mccoy • Antonio Nappa • Vern Paxson • Paul Pearce • Niels Provos • Moheeb Abu Rajab; Ad Injection at Scale: Assessing Deceptive Advertisement Modifications; (Year: 2015).\*

\* cited by examiner

SYSTEMS AND METHODS FOR PROTECTING WEBSITE VISITORS

BACKGROUND

In the modern web, each visit to a website results in the delivery of a unique application to the user. Real time changes to content, advertisement delivery, and tracking systems can cause each instance of the website to be unique. Attempts to judge the safety of a website or a web-based application result in an evaluation of that website at one point in time in one specific context. This assessment may or may not correspond to the actual content delivered to a different endpoint consuming that content at a different point in time. While some related systems can evaluate specific pieces of web content using signature matches, there is currently no way to evaluate a specific instance of a website or to block active content delivered from a website based on things such as a reputation or prevalence of that content. Also, because the content in the body of the website changes frequently (e.g., changes each time that a user visits the website) it is not reliable to assert that a particular website is safe by referencing a uniform resource locator or public key certificate. Instead, the entire page content must be inspected, and inspection is expensive and slows down the browsing experience. The instant disclosure, therefore, identifies and addresses a need for improved systems and methods for protecting website visitors.

SUMMARY

As will be described in greater detail below, the instant disclosure describes various systems and methods for protecting website visitors. In one example, a computer-implemented method for protecting website visitors may include (i) retrieving an instance of a website that was dynamically generated by aggregating multiple website subcomponents, (ii) decomposing the instance of the website into the multiple website subcomponents, (iii) checking whether a website subcomponent has been previously scanned by a security scanner, (iv) accelerating a review of the instance of the website by reusing results of a previous scan of the website subcomponent that was performed in response to retrieving a different instance of the website subcomponent rather than performing an original scan of the website subcomponent, and (v) protecting a visitor of the website by modifying a display of the instance of the website based on the accelerated review of the instance of the website that reused results of the previous scan of the website subcomponent.

In one embodiment, the method is performed in coordination with a client-side website browser and accelerating the review of the instance of the website further accelerates a speed of displaying the instance of the website to the visitor. In one embodiment, the computer-implemented method may further include classifying a remainder of the multiple website subcomponents as previously unknown and performing an original scan of the remainder of the multiple website subcomponents that are classified as previously unknown.

In one embodiment, the remainder of the multiple website subcomponents classified as previously unknown may include less than a majority of the multiple website subcomponents. In one embodiment, the website subcomponent may include an active content object. In one embodiment, the active content object is programmed according to a website scripting language.

In some examples, the previous scan of the website subcomponent was performed in response to retrieving an instance of a different website that also included the website subcomponent. In some examples, the previous scan of the website subcomponent was performed in response to retrieving an instance of the website subcomponent for a different visitor than the visitor of the website.

In some examples, protecting the visitor of the website by modifying the display of the instance of the website may include blocking the website subcomponent from the display. In some examples, protecting the visitor of the website by modifying the display of the instance of the website may include replacing the website subcomponent within the display.

In one embodiment, a system for implementing the above-described method may include (i) a retrieval module, stored in memory, that retrieves an instance of a website that was dynamically generated by aggregating multiple website subcomponents, (ii) a decomposition module, stored in memory, that decomposes the instance of the website into the multiple website subcomponents, (iii) a checking module, stored in memory, that checks whether a website subcomponent has been previously scanned by a security scanner, (iv) an acceleration module, stored in memory, that accelerates a review of the instance of the website by reusing results of a previous scan of the website subcomponent that was performed in response to retrieving a different instance of the website subcomponent rather than performing an original scan of the website subcomponent, (v) a protection module, stored in memory, that protects a visitor of the website by modifying a display of the instance of the website based on the accelerated review of the instance of the website that reused results of the previous scan of the website subcomponent, and (vi) at least one physical processor configured to execute the retrieval module, the decomposition module, the checking module, the acceleration module, and the protection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) retrieve an instance of a website that was dynamically generated by aggregating multiple website subcomponents, (ii) decompose the instance of the website into the multiple website subcomponents, (iii) check whether a website subcomponent has been previously scanned by a security scanner, (iv) accelerate a review of the instance of the website by reusing results of a previous scan of the website subcomponent that was performed in response to retrieving a different instance of the website subcomponent rather than performing an original scan of the website subcomponent, and (v) protect a visitor of the website by modifying a display of the instance of the website based on the accelerated review of the instance of the website that reused results of the previous scan of the website subcomponent.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
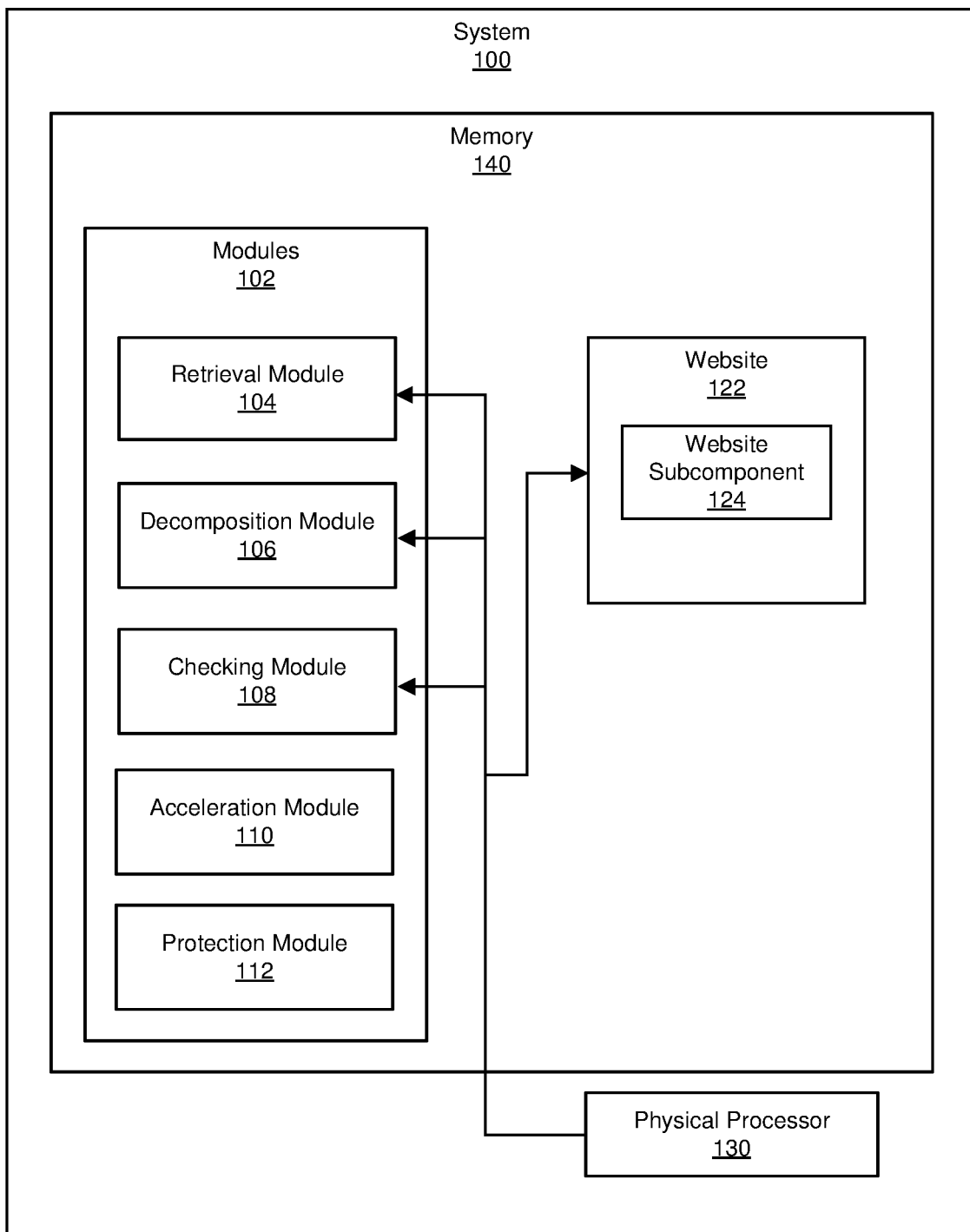
FIG. 1 is a block diagram of an example system for protecting website visitors.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting website visitors. The disclosed subject matter may protect website visitors by improving upon systems that scan websites for unsafe or malicious content. In some examples, the disclosed subject matter may improve upon the systems by scanning smaller and individual subcomponents of the website, where the scanning of one subcomponent is performed independently of another subcomponent, and furthermore leveraging previously stored results of a scan of another instance of one of the subcomponents, thereby omitting a more time-consuming original scan of that subcomponent. Because many of the subcomponents of a website may be prevalent across the world wide web, the disclosed subject matter may be able to reuse previously stored scans of many different subcomponents within a particular website, thereby dramatically reducing an amount of time and resources consumed in reviewing the entire website for unsafe or malicious content.

Figure 2:
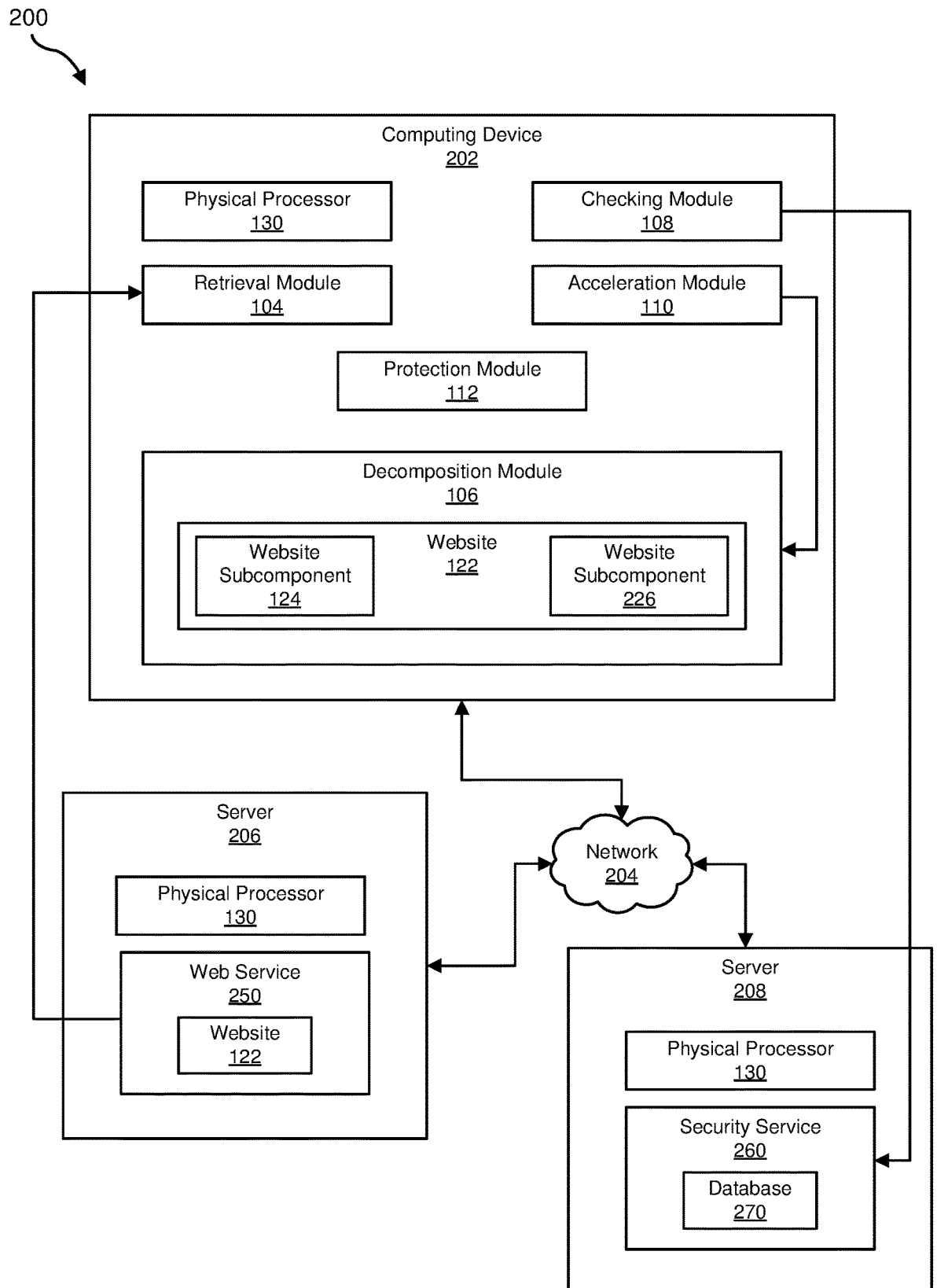
FIG. 2 is a block diagram of an additional example system for protecting website visitors.

The following will provide, with reference to FIGS. 1-2, detailed descriptions of example systems for protecting website visitors. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for protecting website visitors. As illustrated in this figure, example system 100 may include one or more modules 102 for performing one or more tasks. For example, and as will be explained in greater detail below, example system 100 may include a retrieval module 104 that retrieves an instance of a website, such as a website 122, that was dynamically generated by aggregating multiple website subcomponents, including, for example, a website subcomponent 124. Example system 100 may additionally include a decomposition module 106 that decomposes the instance of the website into the multiple website subcomponents. Example system 100 may also include a checking module 108 that checks whether a website subcomponent has been previously scanned by a security scanner. Example system 100 may additionally include an acceleration module 110 that accelerates a review of the instance of the website by reusing results of a previous scan of the website subcomponent that was performed in response to retrieving a different instance of the website subcomponent rather than performing an original scan of the website subcomponent. Example system 100 may also include a protection module 112 that protects a visitor of the website by modifying a display of the instance of the website based on the accelerated review of the instance of the website that reused results of the previous scan of the website subcomponent. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting website visitors. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect website visitors.

For example, and as will be described in greater detail below, retrieval module 104 may retrieve an instance of website 122 that was dynamically generated by aggregating multiple website subcomponents, including website subcomponent 124 and a website subcomponent 226. Retrieval module 104 may retrieve the instance of website 122 from a web service 250 within server 206. Decomposition module 106 may decompose the instance of website 122 into the multiple website subcomponents, including, for example, website subcomponent 124 and website subcomponent 226. Checking module 108 may check whether one of these website subcomponents, such as website subcomponent 124, has been previously scanned by a security scanner. For example, checking module 108 may check with a security service 260 within a server 208 to determine whether a database 270 includes results of a previous scan of website subcomponent 124. Acceleration module 110 may accelerate a review of the instance of website 122 by reusing results of a previous scan of website subcomponent 124 that was performed in response to retrieving a different instance of website subcomponent 124 rather than performing an original scan of website subcomponent 124. Protection module 112 may protect a visitor of website 122 by modifying a display of the instance of website 122 based on the accelerated review of the instance of website 122 that reused results of the previous scan of website subcomponent 124.

Computing device 202 generally represents any type or form of computing device capable of reading computer-executable instructions. In some illustrative examples, computing device 202 may correspond to a user's personal computing system, such as a laptop, desktop, and/or smartphone. Additional examples of computing device 202 include, without limitation, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of functioning as web service 250. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. In some examples, a configuration of server 208 may parallel the configuration of server 206 partially or entirely.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
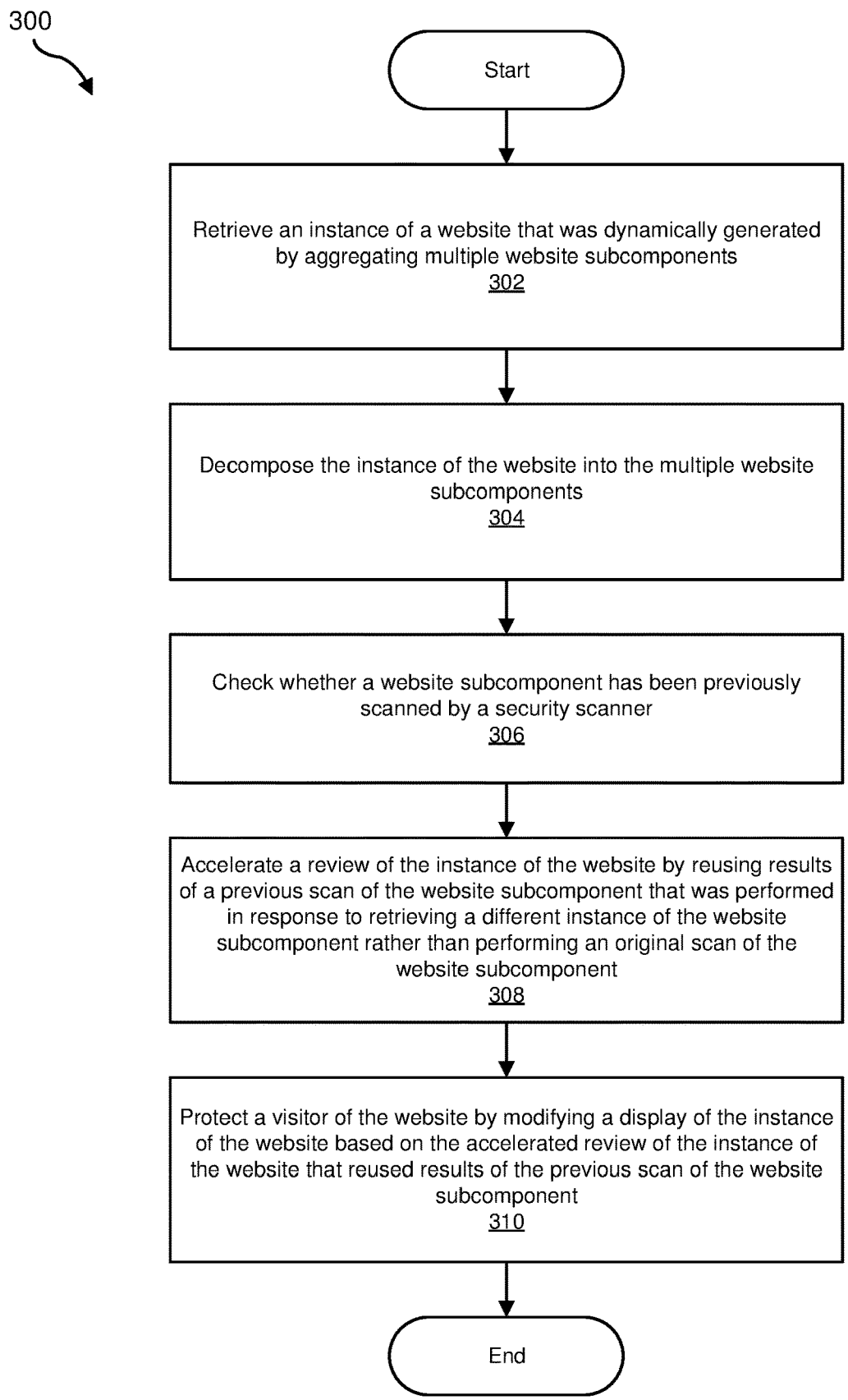
FIG. 3 is a flow diagram of an example method for protecting website visitors.

FIG. 3 is a flow diagram of an example computer-implemented method 300 for protecting website visitors. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may retrieve an instance of a website that was dynamically generated by aggregating multiple website subcomponents. For example, retrieval module 104 may, as part of computing device 202 in FIG. 2, retrieve an instance of website 122 that was dynamically generated by aggregating multiple website subcomponents, such as website subcomponent 124 and website subcomponent 226.

As used herein, the term "instance of a website" generally refers to a final version of the website that is displayed to a user after the aggregation and/or compilation of multiple underlying subcomponents, as discussed further below. This term may reflect the fact that a particular website may change from time to time or from user to user, because underlying subcomponents within the website may be dynamically changing based on one or more factors. Additionally, as used herein, the term "website subcomponent" generally refers to a parsable object within a website that constitutes less than the entirety of the website, and which is identifiable through a specific name, formatting, configuration, identifier, header, and/or tag, such as a markup language tag. In other words, the term "subcomponent" refers to an object that forms part of a larger component, which may be the entire website. In some cases, the website subcomponent may include a website layer.

In some illustrative examples, one or more website subcomponents may be retrieved from different locations than other website subcomponents. For example, a main body of a website may be provided by a web server where the website is hosted. In contrast, a rectangular advertisement that is dynamically inserted within the website may be hosted within a different web server where the advertising content is hosted.

In one embodiment, the website subcomponent may include an active content object. In further embodiments, the active content object is programmed according to a website scripting language. For example, the website scripting language may include JAVASCRIPT. Other website scripting languages may include ACTIONSCRIPT, ATSCRIPT, COFFEESCRIPT, DART, JSCRIPT.NET, LIVESCRIPT, OBJECTIVE-J, OPA, PERL 6, QML, and/or TYPESCRIPT. In other examples, the active content object may include a FLASH object. In additional or alternative examples, the website subcomponent may include only static content, such as text, an image, or a video. In some examples, the website subcomponent may be separated from other website subcomponents by an identifier such as a tag, including a markup language tag (e.g., an HTML tag), a bracket, a brace, a less-than sign, a greater-than sign, a title, a name, a header, and/or an item of metadata. In further examples, the website subcomponent may correspond to a specific subspace or location within the display of the website, such as a rectangular banner advertisement inserted within the display of the website.

Retrieval module 104 may retrieve the instance of the website in a variety of ways. In general, retrieval module 104 may retrieve the instance of the website in response to a request to retrieve the website. In some examples, retrieval module 104 may retrieve the instance of the website in response to a request that is transmitted by web browser. For example, retrieval module 104 may issue a request for the website over the HYPERTEXT TRANSFER PROTOCOL. The web browser may be operated manually by a human user. In other examples, the request for the instance of the website may be transmitted by an automated or autonomous program, script, application, and/or agent.

In one embodiment, all or part of method 300, including step 302, is performed in coordination with a client-side website browser. For example, some or all of the steps of method 300 may be performed by a client-side website browser plug-in. In another example, the client-side website browser may be included within computing device 202. Moreover, a human user at computing device 202 may operate the client-side website browser manually. For example, the human user may navigate the client-side website browser to a particular website location or uniform resource locator. In response, retrieval module 104 may retrieve the instance of the website, as discussed further above.

At step 304, one or more of the systems described herein may decompose the instance of the website into the multiple website subcomponents. For example, decomposition module 106 may, as part of computing device 202 in FIG. 2, decompose the instance of website 122 into multiple website subcomponents, such as website subcomponent 124 and website subcomponent 226. As used herein, the phrase "decompose the instance of the website" generally refers to parsing one or more files (e.g., documents) that define the instance of the website in a manner that identifies and distinguishes between different website subcomponents aggregated within the website, as further discussed above.

Decomposition module 106 may decompose the instance of the website in a variety of ways. In general, decomposition module 106 may decompose the instance of the website by parsing the instance of the website. For example, decomposition module 106 may scan one or more documents that define the instance of the website for one or more markers that distinguish between, or delineate, different website subcomponents. These markers may optionally include a tag, including a markup language tag (e.g., an HTML tag), a bracket, a brace, a less-than sign, a greater-than sign, a title, a name, a header, and/or an item of metadata. In general, decomposition module 106 may parse the one or more documents that define the instance of the website to construct a model of the different subcomponents that were previously stitched together to form the instance of the website.

Figure 4:
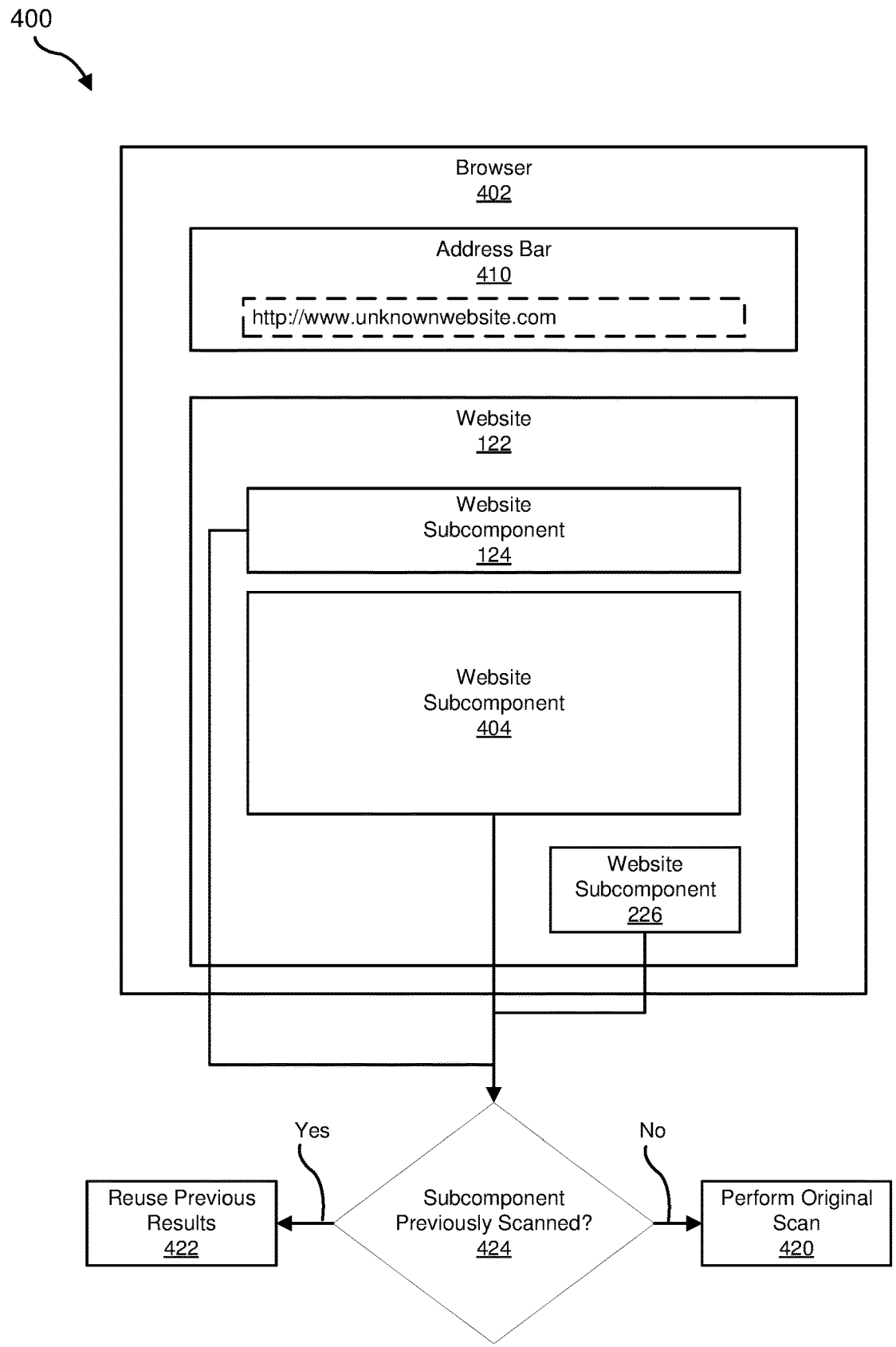
FIG. 4 is a block diagram of an example workflow for protecting website visitors.

FIG. 4 illustrates an example workflow 400 according to one embodiment of the disclosed subject matter. As further shown in this figure, workflow 400 may include a browser 402. Within a graphical user interface of browser 402, there may be displayed an address bar 410. In this specific example, a user has entered text into address bar 410 to navigate browser 402 to a specific uniform resource locator (i.e., http://www.unknownwebsite.com). Additionally, this figure further illustrates how browser 402 may display an instance of website 122. In this example, website 122 may further include multiple different website subcomponents, including website subcomponent 124, website subcomponent 226, and a website subcomponent 404. As further discussed above, decomposition module 106 may decompose the instance of website 122 by parsing one or more documents that define website 122 (e.g., define a layout of website 122). Upon parsing the one or more documents that define website 122, decomposition module 106 may identify website subcomponent 124, website subcomponent 404, and/or website subcomponent 226 as separate website subcomponents that had previously been stitched together to form the instance of website 122. In some examples, one or more of these different website subcomponents may have been inserted into the instance of website 122 by an advertising system. Additionally, in further examples, one or more of these different website subcomponents may be shared between a wide variety of different websites, not just website 122.

At step 306, one or more of the systems described herein may check whether a website subcomponent has been previously scanned by a security scanner. For example, checking module 108 may, as part of computing device 202 in FIG. 2, check whether website subcomponent 124 has been previously scanned by a security scanner. As used herein, the term "security scanner" generally refers to any hardware, firmware, and/or software component that performs a security scan of a website subcomponent, as discussed further below.

Checking module 108 may check whether website subcomponent 124 has been previously scanned by the security scanner in a variety of ways. Returning to FIG. 2, checking module 108 may check whether website subcomponent 124 has been previously scanned in part by querying security service 260. For example, checking module 108 may inquire with security service 260 about whether a result of a previous scan of website subcomponent 124 is stored within database 270. In general, database 270 may correspond to a database that stores results of previous scans of website subcomponents. One or more instances of database 270 may be partially or entirely centralized in the sense that they may aggregate results of previous scans of website subcomponents from a multitude of requests for instances of a particular website, from a multitude of requests for instances of different websites, and/or from a multitude of requests for varying websites from different users. Accordingly, security service 260 may enable one or more users to benefit from the results of previous scans of website subcomponents, which may be cached within database 270. By enabling checking module 108 to query security service 260 to determine whether website subcomponent 124 has previously been scanned, checking module 108 at step 306 may contribute to the acceleration of website security scanning and/or website displaying, as discussed further below in connection with the remainder of method 300, because reusing the results of the previous scan may be substantially faster than performing an original scan of the same website subcomponent.

In one embodiment, checking module 108 may classify a remainder of the multiple website subcomponents as previously unknown. In the example of FIG. 4, checking module 108 may determine that website subcomponent 124 has been previously scanned and, similarly, website subcomponent 226 has been previously scanned. Accordingly, this leaves a remainder of the multiple website subcomponents, website subcomponent 404, which has not been previously scanned. Accordingly, checking module 108 may classify website subcomponent 404 as previously unknown. Furthermore, acceleration module 110 and/or protection module 112 may subsequently perform an original scan of website subcomponent 404.

In some examples, the remainder of the multiple website subcomponents classified as previously unknown may include less than a majority of the multiple website subcomponents. In the example of FIG. 4, the remainder of the website subcomponents may correspond to website subcomponent 404, which may constitute less than a majority of the three separate website subcomponents included within the instance of website 122 (i.e., website subcomponent 124, website subcomponent 404, and website subcomponent 226). Importantly, a large number of website subcomponents within a particular instance of website 122 may have been previously scanned by the security scanner, which may leave a small minority remainder of website subcomponents that have been classified as previously unknown. Accordingly, method 300 may reduce a number of website subcomponents that will be the targets of a time and resource expensive original scanning process, thereby reducing the overall time and resources consumed scanning the instance of website 122 and/or displaying the instance of website 122.

As further discussed above, checking module 108 may in some examples cycle through an entire set of website subcomponents in a loop (e.g., some or all of the website subcomponents within website 122). For example, checking module 108 may first check whether website subcomponent 124 has been previously scanned by the security scanner. Checking module 108 may then subsequently check whether website subcomponent 226 has been previously scanned by the security scanner. Furthermore, checking module 108 may then subsequently check whether website subcomponent 404 has been previously scanned by the security scanner. In other examples, checking module 108 may check whether two or more of the website subcomponents have been previously scanned in a parallel checking step and/or in a batch mode that transmits multiple website subcomponent identifiers to security service 260.

At step 308, one or more of the systems described herein may accelerate a review of the instance of the website by reusing results of a previous scan of the website subcomponent that was performed in response to retrieving a different instance of the website subcomponent rather than performing an original scan of the website subcomponent. For example, acceleration module 110 may, as part of computing device 202 in FIG. 2, accelerate a review of the instance of website 122 by reusing results of a previous scan of website subcomponent 124 that was performed in response to retrieving a different instance of website subcomponent 124 rather than performing an original scan of website subcomponent 124. As used herein, the term "original scan" generally refers to a scan of the website subcomponent that does not use results of an earlier scan.

Additionally, as used herein, the phrase "retrieving a different instance of the website subcomponent" generally refers to any retrieval of the website subcomponent outside of the retrieval of the instance of the website at step 302. Illustrative examples of retrieving the different instance of the website subcomponent may include (i) the same user, or a different user, retrieving another instance of a website that includes the website subcomponent and/or (ii) retrieving the website subcomponent independently without retrieving an entire website. For example, the previous scan of the website subcomponent may have been performed in response to retrieving an instance of a different website that also included the website subcomponent. Additionally or alternatively, the previous scan of the website subcomponent may have been performed in response to retrieving an instance of the website subcomponent for a different visitor than the visitor of the website.

Acceleration module 110 may accelerate the review of the instance of the website in a variety of ways. In general, acceleration module 110 may accelerate a review of the instance of the website by substituting the reusing of results of a previous scan of the website subcomponent for an original scan of the website subcomponent, as further discussed above. In these examples, reusing the results of the previous scan of the website subcomponent may conserve one or more resources, such as time and/or computation, in comparison to performing the original scan of the website subcomponent.

Returning to FIG. 4, at a decision step 424, checking module 108 may check whether the website subcomponent was previously scanned. If the answer is yes, then workflow 400 may proceed to a step 422, at which point acceleration module 110 may reuse results of the previous scan of the website subcomponent. Alternatively, if the answer is no, then workflow 400 may proceed to a step 420, at which point acceleration module 110 and/or protection module 112 may perform an original scan of the website subcomponent. In these examples, acceleration module 110 may also optionally upload a result of the original scan of the website subcomponent to security service 260, where the results of the original scan of the website subcomponent may be stored within database 270. Accordingly, the next time that an instance of checking module 108 queries security service 260 regarding the website subcomponent, security service 260 may provide an indication of the results of the original scan, thereby preventing a redundant original scan of the website subcomponent. As further discussed above, acceleration module 110 may generally cycle through each website subcomponent within a set of website subcomponents, thereby checking the entire set of website subcomponents in an effort to conserve resources such as time and/or computation.

In some examples, a website subcomponent may not have been previously scanned in its exact state, but nevertheless a similar version of the website subcomponent may have been previously scanned. In these examples, the similar version of the website subcomponent may satisfy a numerical threshold of similarity according to a similarity metric that compares the website subcomponent with the similar version of the website subcomponent. For example, a programming language library (e.g., a JAVASCRIPT library) may have only received a minor modification in comparison to an earlier version of the programming language library that was originally scanned. In these examples, checking module 108, acceleration module 110, and/or protection module 112 may employ a smart hashing and/or clustering algorithm to enable one or more of these modules to reuse the results of the original scan of the similar version of the website subcomponent, even though the current version of the website subcomponent is slightly different, as further discussed above.

Moreover, in some embodiments, a website provider such as web service 250 may coordinate with retrieval module 104 in order to perform a variation of method 300. In these examples, web service 250 may transmit a hash, fingerprint, and/or identifier of the website subcomponent rather than transmitting the website subcomponent itself. Because the hash, fingerprint, and/or identifier will generally be smaller than the website subcomponent itself, the substitution may conserve time and/or resources. Upon receiving the hash, fingerprint, and/or identifier of the website subcomponent, checking module 108 may use the hash, fingerprint, and/or identifier to perform step 306, as further discussed above. In some examples, this procedure may enable checking module 108 to omit the process of checking module 108 generating a hash, fingerprint, and/or identifier itself, which further conserves resources. Moreover, if the website subcomponent is relatively widespread or prevalent, then retrieval module 104 may in some cases already store a local and cached copy of the website subcomponent. In these cases, retrieval module 104 may simply retrieve the local copy of the website subcomponent for the performance of method 300, which again will further conserve resources.

In further examples, one or more publishers may optionally provide a signed list of hashes, fingerprints, and/or identifiers of content that each respective publisher delivers. Checking module 108 may reference one or more of these lists when performing step 306. This procedure will enable the publishers to digitally sign their content before a user accesses the content.

In some examples, acceleration module 110 may reuse the results of the previous scan of the website subcomponent by retrieving a disposition of the website subcomponent. Acceleration module 110 may retrieve the disposition of the website subcomponent from a security service 260, as further discussed above. In some examples, the disposition may be indexed using one or more of the following as a key: a hash of the website subcomponent, a uniform resource locator where an instance of the website subcomponent is located, a cryptographic security certificate or a public key certificate (e.g., a TRANSPORT LAYER SECURITY or SECURE SOCKETS LAYER certificate), and/or a programming language application programming interface that is used with the website subcomponent (e.g., a JAVASCRIPT application programming interface). Additionally, the disposition of the website subcomponent retrieved by acceleration module 110 may be based on one or more of the following: a reputation of the website subcomponent, a white list that references the website subcomponent, a blacklist that references the website subcomponent, and/or gray list or unknown list that references the website subcomponent, etc.

Additionally, acceleration module 110 may review the instance of the website at least in part by combining or aggregating reviews of multiple underlying website subcomponents. Each review or disposition may include an indication of whether the corresponding website or website subcomponent is known safe, known unsafe, unknown, and/or has a security score or security measurement along an index that indicates a measured level of safety. Each review or disposition may be based on one or more of the following: a reputation of the website subcomponent, the results of a previous scan of the website subcomponent that was uploaded to security service 260 (e.g., according to step 422), an additional or alternative original scan of the website subcomponent, which may optionally be performed locally (e.g., according to step 420), and/or a vendor provided hash or signature for the website subcomponent. In some examples, acceleration module 110 may review the instance of the website by both aggregating reviews of multiple underlying website subcomponents and also considering the context in which retrieval module 104 is retrieving the current instance of the website. For example, if retrieval module 104 is retrieving the current instance of the website as part of a financial transaction, then acceleration module 110 and/or protection module 112 may enforce a security policy that requires every website subcomponent to be trusted.

At step 310, one or more of the systems described herein may protect a visitor of the website by modifying a display of the instance of the website based on the accelerated review of the instance of the website that reused results of the previous scan of the website subcomponent. For example, protection module 112 may, as part of computing device 202 in FIG. 2, protect a visitor of website 122 by modifying a display of the instance of website 122 based on the accelerated review of the instance of website 122 that reused results of the previous scan of website subcomponent 124.

Protection module 112 may protect the visitor of the website in a variety of ways. In general, protection module 112 may protect the visitor of the website by modifying, or adjusting, the formatting, configuration, presentation, and/or display of the instance of the website. In some examples, protection module 112 may protect the visitor of the website by modifying the display of the instance of the website by blocking the website subcomponent from the display. In further examples, protection module 112 may protect the visitor of the website by modifying the display of the instance of the website by replacing the website subcomponent within the display. In some examples, protection module 112 may replace the website subcomponent within the display by replacing the website subcomponent with a stub, blank, empty, default, and/or benign website subcomponent. In further examples, the website subcomponent may include a tracking cookie and protection module 112 may replace the tracking cookie with a safe or non-tracking cookie. Moreover, protection module 112 may optionally replace an entire frame that includes the website subcomponent (e.g., an IFRAME) rather than replacing a specific script (e.g., an instance of JAVASCRIPT) within the frame. Additionally, in some examples, acceleration module 110 accelerating the review of the instance of the website further accelerates a speed of displaying the instance of the website to the visitor.

Figure 5:
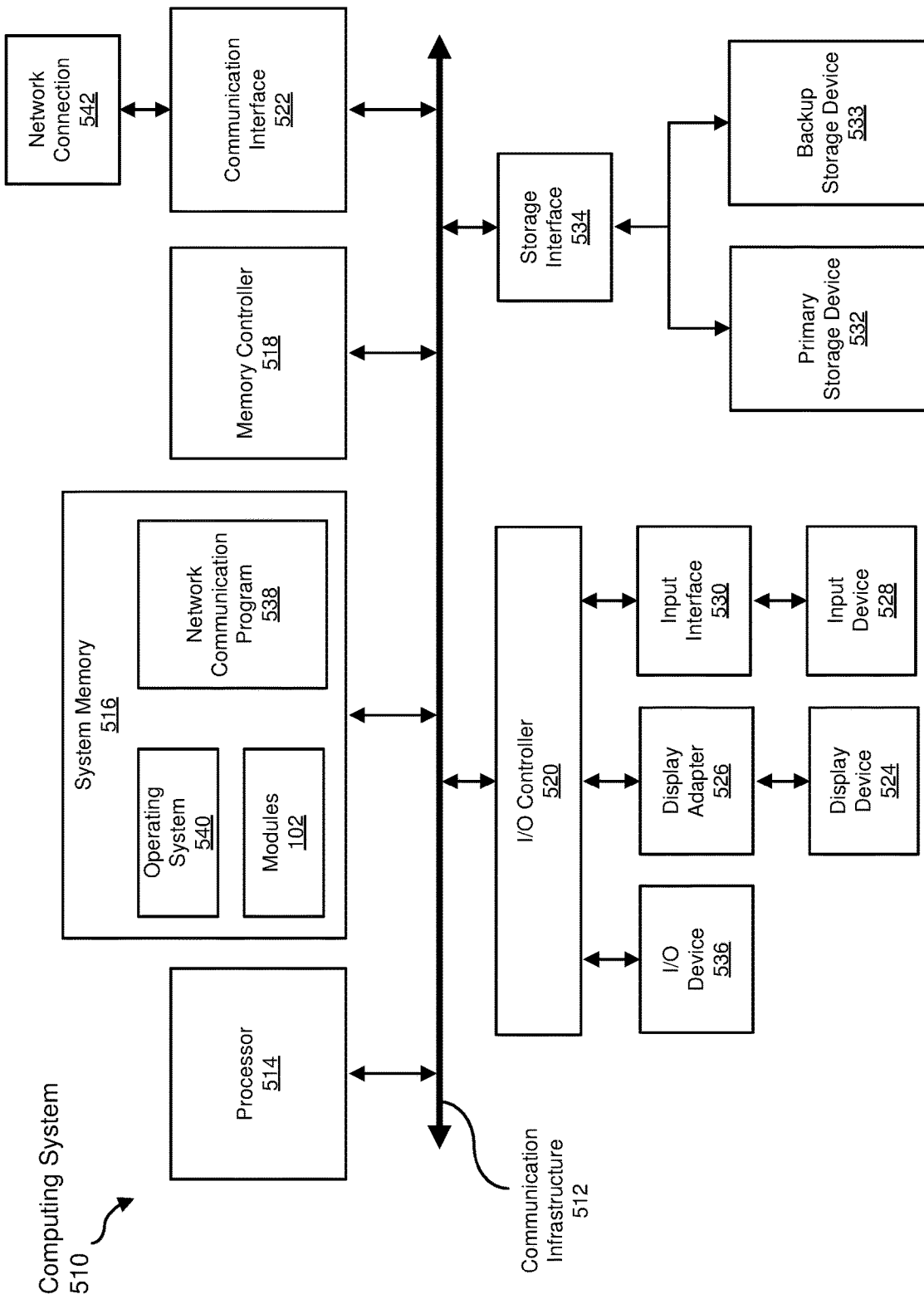
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
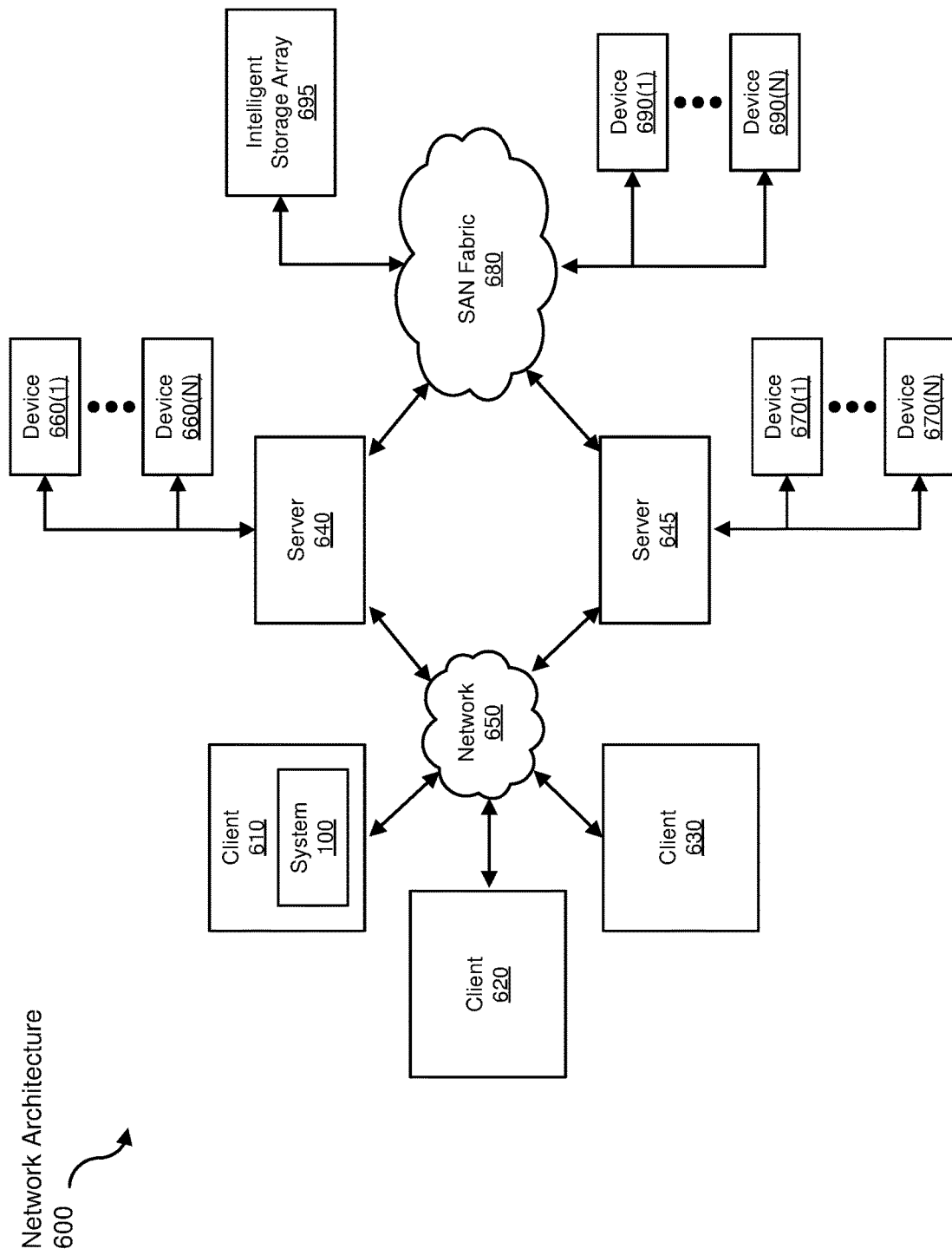
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for protecting website visitors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a website to be transformed, transform the website by blocking or replacing a website subcomponent within the website, and output a result of the transformation to a display device, as further discussed above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting website visitors, at least a portion of the method being performed by a computing device comprising at least one processor, the method comprising:
   retrieving an instance of a website that was dynamically generated by aggregating multiple website subcomponents;
   decomposing the instance of the website into the multiple website subcomponents;
   checking whether a website subcomponent has been previously scanned by a security scanner;
   accelerating a review of the instance of the website by reusing results of a previous scan of the website subcomponent that was performed in response to retrieving a different instance of the website subcomponent rather than performing an original scan of the website subcomponent; and
   protecting a visitor of the website by modifying a display of the instance of the website based on the accelerated review of the instance of the website that reused results of the previous scan of the website subcomponent;
   wherein the previous scan of the website subcomponent was performed in response to retrieving an instance of a different website that also included the website subcomponent such that the results of the previous scan of the website subcomponent at the different website are leveraged to skip the original scan of that website subcomponent at the website; and
   wherein reusing the results of the previous scan of the website subcomponent is performed at least in part by detecting that the website component is a match between the website and the different website according to a hash, a fingerprint, or a smart hash.

2. The computer-implemented method of claim 1, further comprising classifying a remainder of the multiple website subcomponents as previously unknown.

3. The computer-implemented method of claim 2, further comprising performing an original scan of the remainder of the multiple website subcomponents that are classified as previously unknown.

4. The computer-implemented method of claim 3, wherein the remainder of the multiple website subcomponents classified as previously unknown comprises less than a majority of the multiple website subcomponents.

5. The computer-implemented method of claim 1, wherein the website subcomponent comprises an active content object.

6. The computer-implemented method of claim 5, wherein the active content object is programmed according to a website scripting language.

7. The computer-implemented method of claim 1, wherein the website subcomponent comprises a FLASH object.

8. The computer-implemented method of claim 1, wherein the previous scan of the website subcomponent was performed in response to retrieving an instance of the website subcomponent for a different visitor than the visitor of the website.

9. The computer-implemented method of claim 1, wherein protecting the visitor of the website by modifying the display of the instance of the website comprises blocking the website subcomponent from the display.

10. The computer-implemented method of claim 1, wherein protecting the visitor of the website by modifying the display of the instance of the website comprises replacing the website subcomponent within the display.

11. A system for protecting website visitors, the system comprising:
- a retrieval module, stored in memory, that retrieves an instance of a website that was dynamically generated by aggregating multiple website subcomponents;
- a decomposition module, stored in memory, that decomposes the instance of the website into the multiple website subcomponents;
- a checking module, stored in memory, that checks whether a website subcomponent has been previously scanned by a security scanner;
- an acceleration module, stored in memory, that accelerates a review of the instance of the website by reusing results of a previous scan of the website subcomponent that was performed in response to retrieving a different instance of the website subcomponent rather than performing an original scan of the website subcomponent;
- a protection module, stored in memory, that protects a visitor of the website by modifying a display of the instance of the website based on the accelerated review of the instance of the website that reused results of the previous scan of the website subcomponent; and
- at least one physical processor configured to execute the retrieval module, the decomposition module, the checking module, the acceleration module, and the protection module;
- wherein the previous scan of the website subcomponent was performed in response to retrieving an instance of a different website that also included the website subcomponent such that the results of the previous scan of the website subcomponent at the different website are leveraged to skip the original scan of that website subcomponent at the website; and
- wherein reusing the results of the previous scan of the website subcomponent is performed at least in part by detecting that the website component is a match between the website and the different website according to a hash, a fingerprint, or a smart hash.

12. The system of claim 11, wherein:
the system executes in coordination with a client-side website browser; and
the acceleration module accelerates the review of the instance of the website in a manner that further accelerates a speed of displaying the instance of the website to the visitor.

13. The system of claim 11, wherein:
the checking module classifies a remainder of the multiple website subcomponents as previously unknown; and
the protection module performs an original scan of the remainder of the multiple website subcomponents that are classified as previously unknown.

14. The system of claim 13, wherein the remainder of the multiple website subcomponents classified as previously unknown comprises less than a majority of the multiple website subcomponents.

15. The system of claim 11, wherein the website subcomponent comprises an active content object.

16. The system of claim 15, wherein the active content object is programmed according to a website scripting language.

17. The system of claim 11, wherein the website subcomponent comprises a FLASH object.

18. The system of claim 11, wherein the previous scan of the website subcomponent was performed in response to retrieving an instance of the website subcomponent for a different visitor than the visitor of the website.

19. The system of claim 11, wherein the protection module protects the visitor of the website by modifying the display of the instance of the website by blocking the website subcomponent from the display.

20. A non-transitory computer-readable medium comprising one or more computer-readable instructions that, when executed by at least one processor of a computing device, cause the computing device to:
- retrieve an instance of a website that was dynamically generated by aggregating multiple website subcomponents;
- decompose the instance of the website into the multiple website subcomponents;
- check whether a website subcomponent has been previously scanned by a security scanner;
- accelerate a review of the instance of the website by reusing results of a previous scan of the website subcomponent that was performed in response to retrieving a different instance of the website subcomponent rather than performing an original scan of the website subcomponent; and
- protect a visitor of the website by modifying a display of the instance of the website based on the accelerated review of the instance of the website that reused results of the previous scan of the website subcomponent;
- wherein the previous scan of the website subcomponent was performed in response to retrieving an instance of a different website that also included the website subcomponent such that the results of the previous scan of the website subcomponent at the different website are leveraged to skip the original scan of that website subcomponent at the website; and
- wherein reusing the results of the previous scan of the website subcomponent is performed at least in part by detecting that the website component is a match between the website and the different website according to a hash, a fingerprint, or a smart hash.

* * * * *